(12) United States Patent
Lee et al.

(10) Patent No.: US 12,496,006 B2
(45) Date of Patent: Dec. 16, 2025

(54) METHOD AND APPARATUS FOR CORRECTING ELECTROCARDIOGRAM READING

(71) Applicant: SEERSTECHNOLOGY CO., LTD., Seongnam-si (KR)

(72) Inventors: Youngshin Lee, Yongin-si (KR); Heeseok Song, Hwaseong-si (KR); Jongdoo Choi, Yangpyeong-gun Gyeonggi-do (KR)

(73) Assignee: SEERSTECHNOLOGY CO., LTD. (KR)

( * ) Notice: Subject to any disclaimer, the term of this patent is extended or adjusted under 35 U.S.C. 154(b) by 588 days.

(21) Appl. No.: 17/916,564

(22) PCT Filed: Dec. 23, 2021

(86) PCT No.: PCT/KR2021/019738
§ 371 (c)(1),
(2) Date: Sep. 30, 2022

(87) PCT Pub. No.: WO2023/120775
PCT Pub. Date: Jun. 29, 2023

(65) Prior Publication Data
US 2024/0215901 A1 Jul. 4, 2024

(30) Foreign Application Priority Data
Dec. 23, 2021 (KR) .......... 10-2021-0185525

(51) Int. Cl.
| | | |
|---|---|---|
| *A61B 5/352* | (2021.01) | |
| *A61B 5/308* | (2021.01) | |
| *A61B 5/339* | (2021.01) | |

(52) U.S. Cl.
CPC .............. *A61B 5/352* (2021.01); *A61B 5/308* (2021.01); *A61B 5/339* (2021.01)

(58) Field of Classification Search
CPC ......... A61B 5/352; A61B 5/308; A61B 5/339; A61B 5/35; A61B 5/7264; A61B 5/364; G16H 50/20
See application file for complete search history.

(56) References Cited

U.S. PATENT DOCUMENTS

| | | | | |
|---|---|---|---|---|
| 2005/0057560 A1* | 3/2005 | Bibr | .................. | G06F 9/451 345/418 |
| 2021/0128003 A1* | 5/2021 | Brennan | ................ | A61B 5/339 |

FOREIGN PATENT DOCUMENTS

| | | |
|---|---|---|
| JP | 2001212095 A | 8/2001 |
| KR | 20170143083 A | 12/2017 |
| KR | 20190128841 A | 11/2019 |

(Continued)

*Primary Examiner* — Mark W. Bockelman
(74) *Attorney, Agent, or Firm* — Renaissance IP Law Group LLP

(57) ABSTRACT

Disclosed are method and apparatus for correcting an electrocardiogram reading.
When using an electrocardiograph in the present embodiment, there is a possibility that the automatic reading function incorrectly reads the patient's electrocardiogram. Therefore, since rereading is necessary with reference to the results of the automatic reader, a method and apparatus for correcting an electrocardiogram reading, which allow the electrocardiogram reading to be easily corrected and then checked when rereading the automatic reading result, are provided.

10 Claims, 7 Drawing Sheets

(56) References Cited

FOREIGN PATENT DOCUMENTS

KR     20210105103 A     8/2021
KR       102322234 B1   11/2021

* cited by examiner

METHOD AND APPARATUS FOR CORRECTING ELECTROCARDIOGRAM READING

TECHNICAL FIELD

An embodiment of the present disclosure relates to a method and apparatus for correcting an electrocardiogram reading.

BACKGROUND ART

The content described below simply provides background information only related to the present embodiment, but does not constitute the conventional art.

An electrocardiogram reading system which helps medical staff analyze an electrocardiogram has been developed. A conventional electrocardiogram reading system detects R, P, and T peaks of waveforms, and detects and classifies arrhythmias based on a rule.

A conventional electrocardiogram reading system receives and analyzes the entire electrocardiogram signal data of a patient and outputs the result. Deep learning technology has recently been studied a lot as an electrocardiogram reading algorithm since it has higher accuracy than existing methods.

Arrhythmia determination using an electrocardiogram can only be performed by medical staff with certain qualifications, but the reality is that there is a shortage of manpower compared to the demand. When reading the electrocardiogram, it takes a lot of time since electrocardiogram signals need to be read from various viewpoints, such as calculating the time difference between the shapes and sections of the P, QRS, and T waveforms, and analyzing the electrocardiogram rhythms. A bedridden patient's electrocardiogram should be observed in real time by medical staff to keep an eye on the patient's condition, but continuous monitoring is difficult due to a shortage of manpower. Since electrocardiogram analysis is directly related to the patient's life, it should be accurate and should be operated quickly when an emergency patient occurs.

There is a case that conventional electrocardiogram analysis uses the endpoints, starting points, etc. of P, QRS, and T waveform sections, but the conventional art finds only the peak and its utility is low. Designing of a rule-based algorithm during arrhythmia detection and classification has a deteriorated accuracy due to the diversity of waveforms, and a new rule-based algorithm should be designed when an arrhythmia is added.

The conventional electrocardiogram reading system cannot be utilized where real-time reading is required, such as monitoring a bedridden patient. A deep learning algorithm for electrocardiogram analysis has a speed difference depending on the implementation model, and cannot operate every hour for real-time operation. When visualizing an electrocardiogram waveform, it is an output for one-dimensional data, and readability is decreased when reading it in real time.

Recently, there is a trend of using artificial intelligence (AI) in the medical world in order to diagnose heart diseases such as arrhythmias. However, in the case of electrocardiogram reading, various algorithms are not applied due to complexity, and the accuracy is low so that an experienced expert has to visually search and correct the automatically read data one by one. When reading the electrocardiogram, there are problems in that it takes a long time and is cumbersome since it is necessary to check the entire electrocardiogram waveform rather than just performing reading itself only.

DISCLOSURE

Technical Problem

In the present embodiment, when an electrocardiograph is used, a possibility that the automatic reading function incorrectly reads the patient's electrocardiogram exists. Therefore, it is an object to provide a method and apparatus for correcting electrocardiogram reading, which allow the correction results to be collectively reflected in groups grouped by similar waveforms when rereading and correcting the results of the automatic reader.

Technical Solution

According to an aspect of the present embodiment, there is provided an electrocardiogram reading apparatus including: an electrocardiogram waveform acquisition unit for receiving electrocardiogram waveforms (ECG Raw Data); a waveform reading unit for outputting a reading result of analyzing the electrocardiogram waveforms based on a preset waveform shape and RR interval on one side of a screen; an occurrence time management unit for matching with the electrocardiogram waveforms to generate a reading time for each reading result as described above in a separate beat table and outputting it on the other side of the screen; and a reading correction unit for allowing to correct together the reading result matched with the specific electrocardiogram waveform on the beat table when the reading result of the specific electrocardiogram waveform is corrected.

Advantageous Effects

According to the present embodiment as described above, since a possibility that the automatic reading function incorrectly reads the patient's electrocardiogram exists when an electrocardiograph is used, there is an effect of allowing the correction results to be collectively reflected in groups grouped by similar waveforms when rereading and correcting the results of the automatic reader.

According to the present embodiment, there is an effect that it can be used in all of various medical devices that measure electrocardiogram and wellness/fitness devices in addition to the wearable electrocardiogram patch. According to the present embodiment, there is an effect that an electrocardiogram can be read more easily, quickly and accurately in health examination centers, hospitals, and medical institutions requiring electrocardiogram reading.

DETAILED DESCRIPTION

Hereinafter, the present embodiment will be described in detail with reference to the accompanying drawings.

Figure 1:
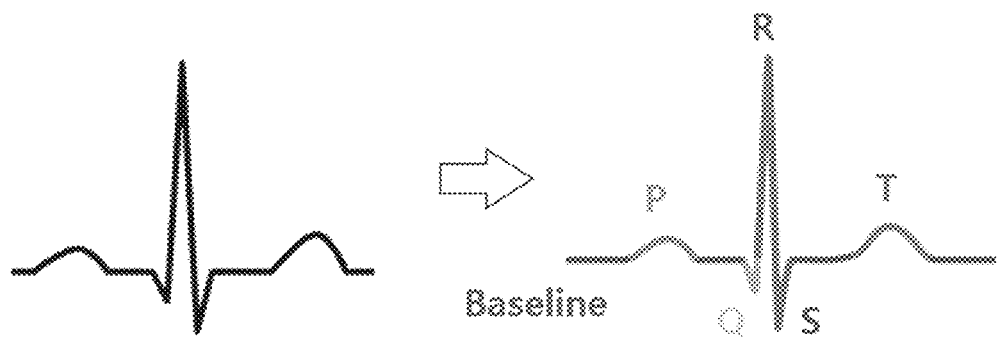
FIG. 1 is a view showing biosignal data processing in a biosignal processing field according to the present embodiment.

FIG. 1 is a view showing biosignal data processing in a biosignal processing field according to the present embodiment.

The electrocardiogram reading apparatus 300 performs an electrocardiogram test for diagnosing heart diseases such as arrhythmias, angina pectoris, myocardial infarction, and cardiac hypertrophy as a test for recording an electric signal generated during a heartbeat as a waveform by an electric current.

The electrocardiogram reading apparatus 300 according to the present embodiment may be applied to one-dimensional (1D) biosignal data processing in the biosignal processing field. The electrocardiogram reading apparatus 300 divides the P waveform, QRS-complex (N, S, V), T waveform, and noise waveform included in the electrocardiogram waveforms into waveform units.

The electrocardiogram reading apparatus 300 classifies the electrocardiogram waveforms into one of Normal beat (N), Supraventricular ectopic beat (S), Ventricular ectopic beat (V), Fusion beat (F), and Unknown beat (Q).

Figure 2:
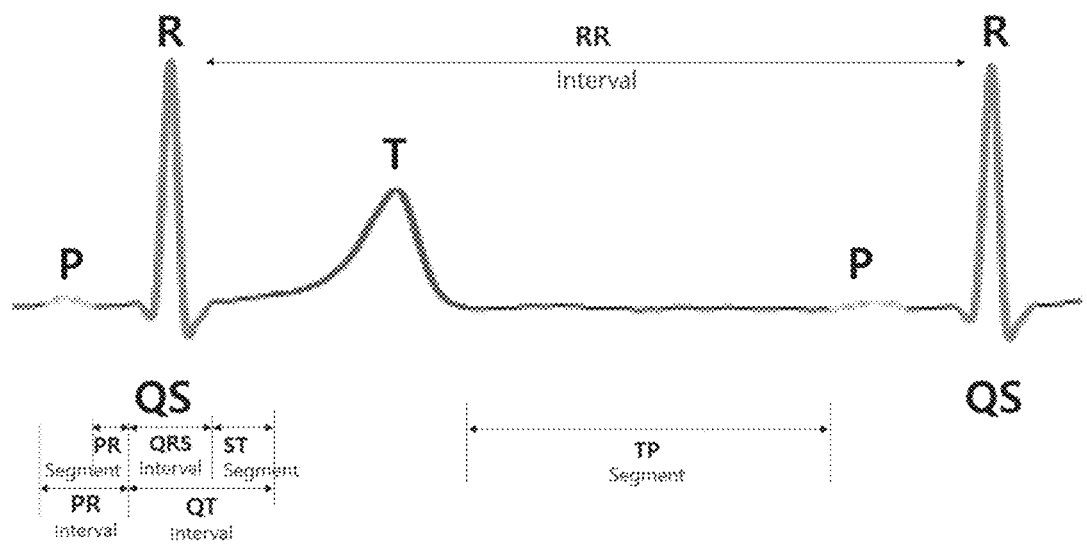
FIG. 2 is a view showing P, Q, R, S and T waves (P wave, QRS complex, and T wave) and electrocardiogram characteristic indicators according to the present embodiment.

FIG. 2 is a view showing P, Q, R, S and T waves (P wave, QRS complex, and T wave) and electrocardiogram characteristic indicators according to the present embodiment.

The electrocardiogram waveforms appear as a series of beats, and the beats may be largely divided into normal beats (N), supraventricular beats (S), and ventricular beats (V). One beat of the electrocardiogram waveforms basically includes a P waveform, a QRS waveform, and a T waveform.

The electrocardiogram reading apparatus 300 senses the P waveform, Q waveform, R waveform, S waveform, and T waveform included in the electrocardiogram waveforms, and classifies the normal beat (N), supraventricular beat (S), and ventricular beat (V). The electrocardiogram reading apparatus 300 outputs various characteristic indicators of the electrocardiogram by performing localization of the P waveform, Q waveform, R waveform, S waveform, and T waveform.

The electrocardiogram reading apparatus 300 divides the PR interval, QRS interval, QT interval, ST segment, and RR interval for the input electrocardiogram waveforms.

The electrocardiogram reading apparatus 300 may classify the beats based on characteristic information of the P waveform, Q waveform, R waveform, S waveform, and T waveform based on the PR interval, QRS interval, QT interval, ST segment, and RR interval.

The electrocardiogram reading apparatus 300 classifies a heartbeat into a normal beat (N), a supraventricular beat (S), and a ventricular beat (V). When reading the electrocardiogram waveforms, the electrocardiogram reading apparatus 300 may sense an abnormal state based on localization and classification information.

The electrocardiogram reading apparatus 300 senses an abnormal state (arrhythmia, abnormal beats (S, V), ST, QTc, etc.) by using values obtained by performing localization on the electrocardiogram waveforms.

The electrocardiogram reading apparatus 300 performs classification on the electrocardiogram waveforms to classify the heartbeat into a normal beat (N), a supraventricular beat (S), and a ventricular beat (V), and sense an arrhythmia.

The electrocardiogram reading apparatus 300 applies the segmentation technique to the electrocardiogram waveforms to confirm each section of the P waveform, Q waveform, R waveform, S waveform, T waveform, and fibrillation waveform included in the electrocardiogram waveforms. The electrocardiogram reading apparatus 300 classifies the heartbeat into one of a normal beat (N), a supraventricular ectopic beat (S), a ventricular ectopic beat (V), a fusion beat (F), and an unknown beat (Q) based on each section.

Figure 3:
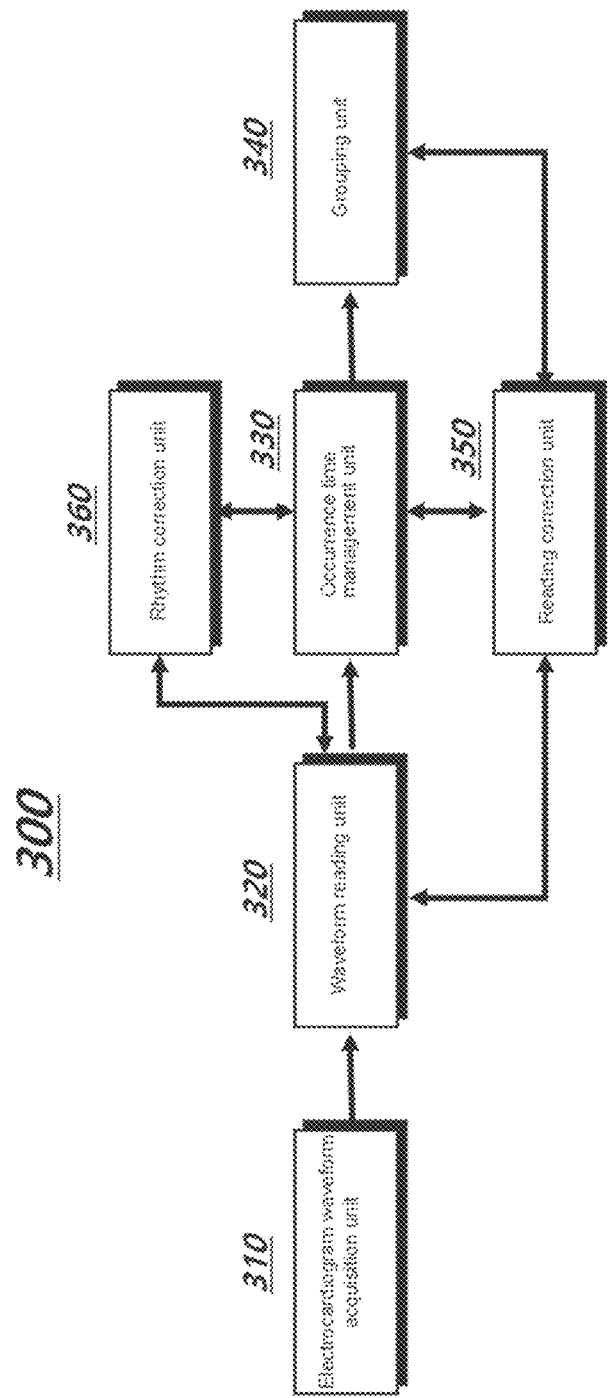
FIG. 3 is a view showing an electrocardiogram reading apparatus according to the present embodiment.

FIG. 3 is a view showing an electrocardiogram reading apparatus according to the present embodiment.

The electrocardiogram reading apparatus 300 according to the present embodiment includes an electrocardiogram waveform acquisition unit 310, a waveform reading unit 320, an occurrence time management unit 330, a grouping unit 340, a reading correction unit 350, and a rhythm correction unit 360.

Components included in the electrocardiogram reading apparatus 300 are not necessarily limited thereto.

The respective components included in the electrocardiogram reading apparatus 300 may be connected to a communication path connecting a software module or a hardware module inside the apparatus so that they organically operate with each other. These components communicate using one or more communication buses or signal lines.

Each component of the electrocardiogram reading apparatus 300 shown in FIG. 3 means a unit that processes at least one function or operation, and may be implemented by a software module, a hardware module, or a combination of software and hardware modules.

The electrocardiogram waveform acquisition unit 310 receives electrocardiogram waveforms (ECG raw data).

The waveform reading unit 320 outputs the reading result of analyzing the electrocardiogram waveforms based on the preset waveform shape and RR interval on one side of the screen. The waveform reading unit 320 reads the electrocardiogram waveforms as any one of normal beat (N), supraventricular ectopic beat (S), ventricular ectopic beat (V), fusion beat (F), and unknown beat (Q) based on the preset waveform shape and RR interval. When a specific reading time is selected from the beat table, the waveform reading unit 320 allows a waveform occurrence time to be output on the electrocardiogram waveform corresponding to the specific reading time.

The occurrence time management unit 330 matches the electrocardiogram waveforms to generate a reading time for each reading result as a separate beat table and outputs it to the other side of the screen. The occurrence time management unit 330 divides the electrocardiogram waveforms into beats, rhythms, and groups to output them, and matches and stores the start time and end time by time for each beat, rhythm, and group.

The grouping unit 340 generates a group in which similar shapes are grouped by performing clustering after extracting the waveforms forward and backward centering on the peaks of the electrocardiogram waveforms at predetermined intervals. When unread beats exist in the electrocardiogram waveforms, the grouping unit 340 clusters waveforms having beats similar to the unread beats and groups them as candidate data.

The grouping unit 340 divides each waveform into three groups based on the interval between the peak and the peak in the beat existing in the electrocardiogram waveforms and the next beat. The grouping unit 340 adds a new group and divides it into a separate group when the waveform shape is not distinguished from the beat table.

When the reading result of a specific electrocardiogram waveform is corrected, the reading correction unit 350 corrects the reading result matched with the specific electrocardiogram waveform on the beat table. When the reading result of the specific electrocardiogram waveform is corrected, the reading correction unit 350 performs correlation analysis with the corrected waveforms among the groups to collectively correct the waveform results in the group having similar subsequent waveforms.

When the reading result of the specific electrocardiogram waveform is corrected, the reading correction unit 350 allows the corrected result to be reflected in the beat table, and when a waveform having a shape similar to the corrected result does not exist, it is newly added to the beat table.

The rhythm correction unit 360 records the start time and end time for each time as the reading result for each rhythm on the reading result confirmation screen for each rhythm, and outputs the corresponding rhythm part when a waveform is selected, and when a rhythm is corrected or removed, the corresponding rhythm is added, corrected, or removed from the beat table and waveform.

Figure 4:
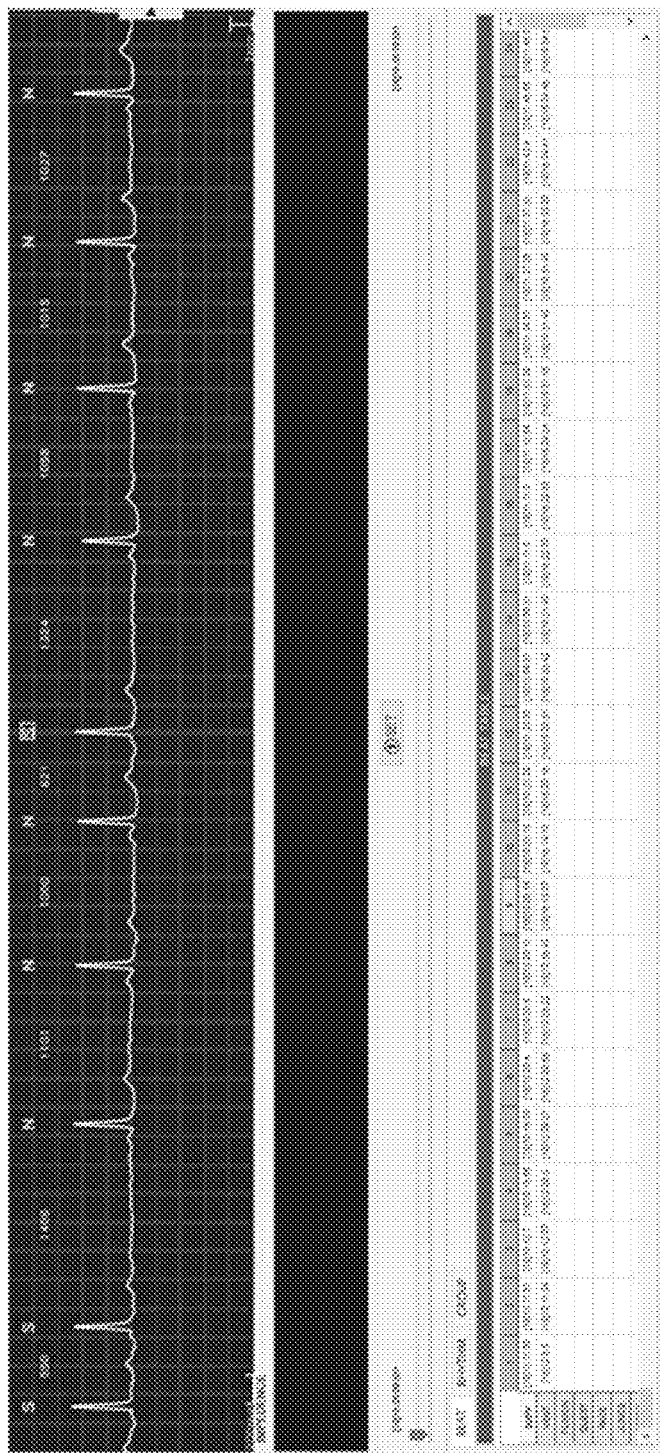
FIG. 4 is a view showing an example of checking the waveform for each beat using a reading correction program according to the present embodiment.

FIG. 4 is a view showing an example of checking the waveform for each beat using a reading correction program according to the present embodiment.

The electrocardiogram reading apparatus 300 according to the present embodiment clusters and outputs the electrocardiogram reading results for each type, finds the part corrected by the user, and corrects the same parts in all data.

As shown in FIG. 4, the electrocardiogram reading apparatus 300 divides a screen for confirming reading results by beat largely into two screens and outputs them by using a reading correction program.

The electrocardiogram reading apparatus 300 expresses beat reading results of a normal beat (N), a supraventricular ectopic beat (S), a ventricular ectopic beat (V), a fusion beat (F), and an unknown beat (Q) as text at the top of each beat in the electrocardiogram waveforms (ECG raw data), and corrects the beat readings.

The electrocardiogram reading apparatus 300 displays the same reading result as the reading time as described in the beat table shown in FIG. 4, and when the desired reading result time is selected from the beat table, the occurrence time of the corresponding waveform in the electrocardiogram waveforms is allowed to be output.

When the electrocardiogram waveform is deleted or corrected, the electrocardiogram reading apparatus 300 automatically selects or deletes a portion corresponding to the corrected waveform on the beat table.

If there is a waveform that has not been caught although a beat exists, when the corresponding beat is read and corrected, the electrocardiogram reading apparatus 300 finds a waveform shape similar to the corresponding beat among the waveforms that have not been read as beats in the entire electrocardiogram waveforms and clusters a candidate group in a candidate table to output it.

Figure 5:
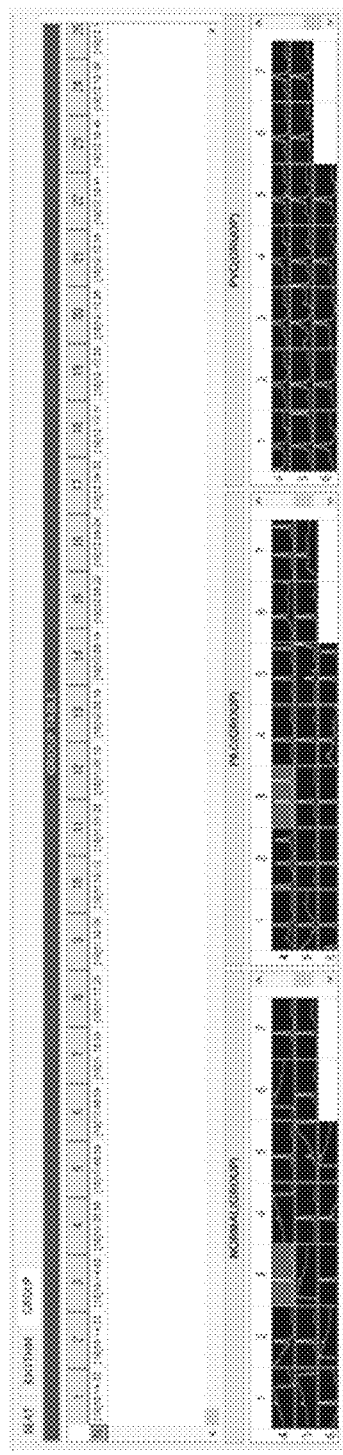
FIG. 5 is a view showing a screen for checking waveforms by grouping similar beats together using the reading correction program according to the present embodiment.

FIG. 5 is a view showing a screen for checking waveforms by grouping similar beats together using the reading correction program according to the present embodiment.

As shown in FIG. 5, the electrocardiogram reading apparatus 300 extracts each waveform at predetermined front/rear intervals based on the center of the peak, and then groups similar shapes together through a clustering method.

The electrocardiogram reading apparatus 300 first determines the number of waveforms to be clustered for clustering. If the electrocardiogram reading apparatus 300 determines a too small number N of clustering, classification cannot be performed. When the electrocardiogram reading apparatus 300 determines a too large number N of clustering, since it is classified as a similar value, a generous number N of clustering is set depending on the number of data. The electrocardiogram reading apparatus 300 includes an algorithm for combining similar shapes into one cluster using correlation analysis for each representative shape.

The electrocardiogram reading apparatus 300 divides the clustered representative waveform into three groups per waveform using the RR Interval, which is one of the important indicators for beat division.

When the automatic reading function makes an erroneous reading using the grouping function, the electrocardiogram reading apparatus 300 collects similar shapes and changes the reading result at once. When shapes of waveforms are selected, the electrocardiogram reading apparatus 300 allows waveforms corresponding to the selected waveform shapes to be aligned by time.

When the reading is corrected, the electrocardiogram reading apparatus 300 allows the correlation analysis-performed corrected waveforms to be automatically moved to the most similar group after performing correlation analysis on the corrected waveforms. The electrocardiogram reading apparatus 300 includes a function of additionally performing clustering within the group when the waveforms are not sufficiently classified in a group.

Figure 6:
FIG. 6 is a view showing an example screen for checking waveforms for each rhythm using the reading correction program according to the present embodiment.

FIG. 6 is a view showing an example screen for checking waveforms for each rhythm using the reading correction program according to the present embodiment.

The electrocardiogram reading apparatus 300 corrects the beat or rhythm reading when correcting the electrocardiogram reading result. The electrocardiogram reading apparatus 300 may immediately correct the beat reading while checking the reading result while outputting the waveforms for each time period of the electrocardiogram waveform graph in order to correct the beat reading.

The electrocardiogram reading apparatus 300 classifies and marks each electrocardiogram waveform as one of Normal beat (N), Supraventricular ectopic beat (S), Ventricular ectopic beat (V), Fusion beat (F), or Unknown beat (Q) based on the waveform shape and RR interval. The electrocardiogram reading apparatus 300 provides a function capable of correcting them while checking the marked results of the respective electrocardiogram waveforms one by one. The electrocardiogram reading apparatus 300 collects and outputs similar waveforms as candidate data while checking unlabeled data within the entire data when a beat is actually present, but has not been read.

The electrocardiogram reading apparatus 300 corrects the beats and groups them. The electrocardiogram reading apparatus 300 extracts each waveform at predetermined front and rear intervals based on the center of the peak, and then groups similar shapes together by performing clustering. The electrocardiogram reading apparatus 300 sets the number of clustering to a sufficient extent and then clusters the waveforms only with similar shapes using correlation analysis. The electrocardiogram reading apparatus 300 automatically allows only non-clustered waveforms to be displayed.

The electrocardiogram reading apparatus 300 divides each waveform into three groups based on the interval between the peak and the peak in the beat existing within the electrocardiogram waveforms and the next beat. The electrocardiogram reading apparatus 300 collectively corrects other waveforms having similar shapes together when an erroneous reading is performed by the automatic reading function using the grouping function.

When a corrected waveform exists among the electrocardiogram waveforms, the electrocardiogram reading apparatus 300 collectively corrects together other waveforms having waveforms similar to the corrected waveform so that it is not necessary to review the same or similar waveforms again.

The electrocardiogram reading apparatus 300 collectively corrects subsequent waveforms having similar shapes based on the corrected pattern waveform and the RR interval. For example, when the electrocardiogram reading apparatus 300 measures an electrocardiogram for 24 hours, approximately 10 or more beats are collected. Therefore, when erroneously read waveforms exist, since the related waveforms cannot be corrected one by one, the subsequent waveforms with similar shapes are collectively corrected based on the RR interval and waveform shape.

When the electrocardiogram reading apparatus 300 corrects the waveform that has been read as a normal beat (N), a waveform having a similar shape is automatically combined, and if there is no similar shape, it is created as a new column. The electrocardiogram reading apparatus 300 divides one group separately by adding one group when the waveform shape is not distinguished on the beat table.

As shown in FIG. 6, the electrocardiogram reading apparatus 300 records the start time and the end time for each time as the reading result for each rhythm on the reading result confirmation screen for each rhythm, and then outputs the corresponding rhythm part if a waveform is selected. When a rhythm is corrected or removed, the electrocardiogram reading apparatus 300 adds, corrects, or removes the corresponding rhythm from the beat table and waveforms. Here, in order to correct the rhythm, the electrocardiogram reading apparatus 300 can adjust the start time and the end time of the rhythm little by little by the operation or command of the reader.

Figure 7:
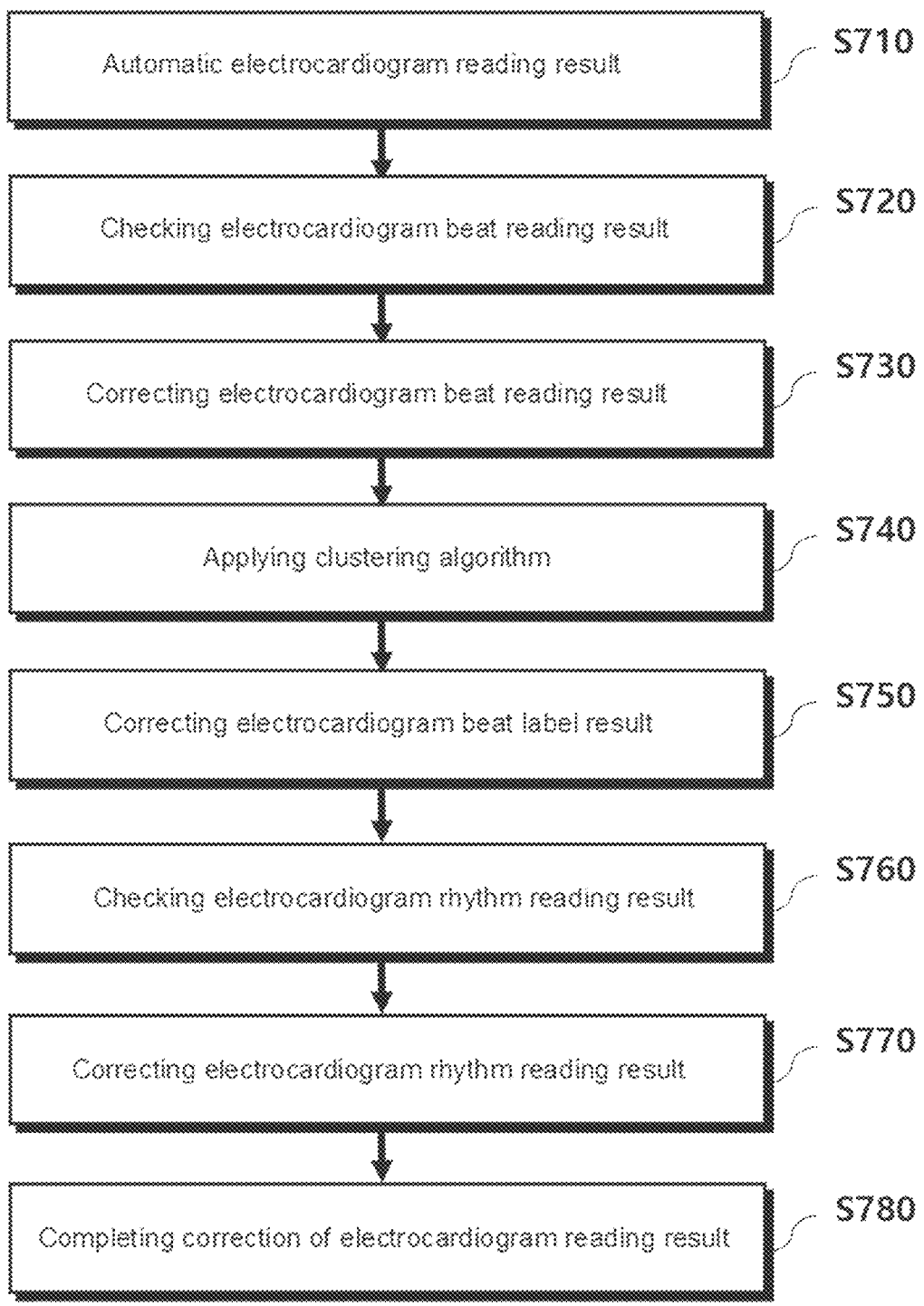
FIG. 7 is a flowchart for explaining a method for correcting an electrocardiogram rhythm reading result according to the present embodiment.

FIG. 7 is a flowchart for explaining a method for correcting an electrocardiogram rhythm reading result according to the present embodiment.

The electrocardiogram reading apparatus 300 outputs an automatic electrocardiogram reading result (S710). The electrocardiogram reading apparatus 300 checks the electrocardiogram beat reading result (S720). The electrocardiogram reading apparatus 300 confirms the correction of the electrocardiogram beat reading result (S730).

The electrocardiogram reading apparatus 300 applies a clustering algorithm to the part corresponding to the correction (S740). The electrocardiogram reading apparatus 300 corrects the electrocardiogram beat label result for the group to which the clustering algorithm is applied (S750). The electrocardiogram reading apparatus 300 checks the electrocardiogram rhythm reading result (S760). The electrocardiogram reading apparatus 300 corrects the electrocardiogram rhythm reading result (S770). The electrocardiogram reading apparatus 300 completes the correction of the electrocardiogram reading result (S780).

Although it is described that the steps S710 to S780 are sequentially executed in FIG. 7, the present disclosure is not necessarily limited thereto. In other words, since changing and executing the steps described in FIG. 7 or executing one or more steps in parallel can be applied, FIG. 7 is not limited to a time-series order.

As described above, the method for correcting the electrocardiogram rhythm reading result according to the present embodiment described in FIG. 7 may be recorded in a recording medium which is implemented with a program and can be read by a computer. The recording medium in which the program for implementing the method for correcting the electrocardiogram rhythm reading result according to the present embodiment is recorded, and the method can be read by the computer includes all types of recording devices in which data readable by a computer system is stored.

Figure 8:
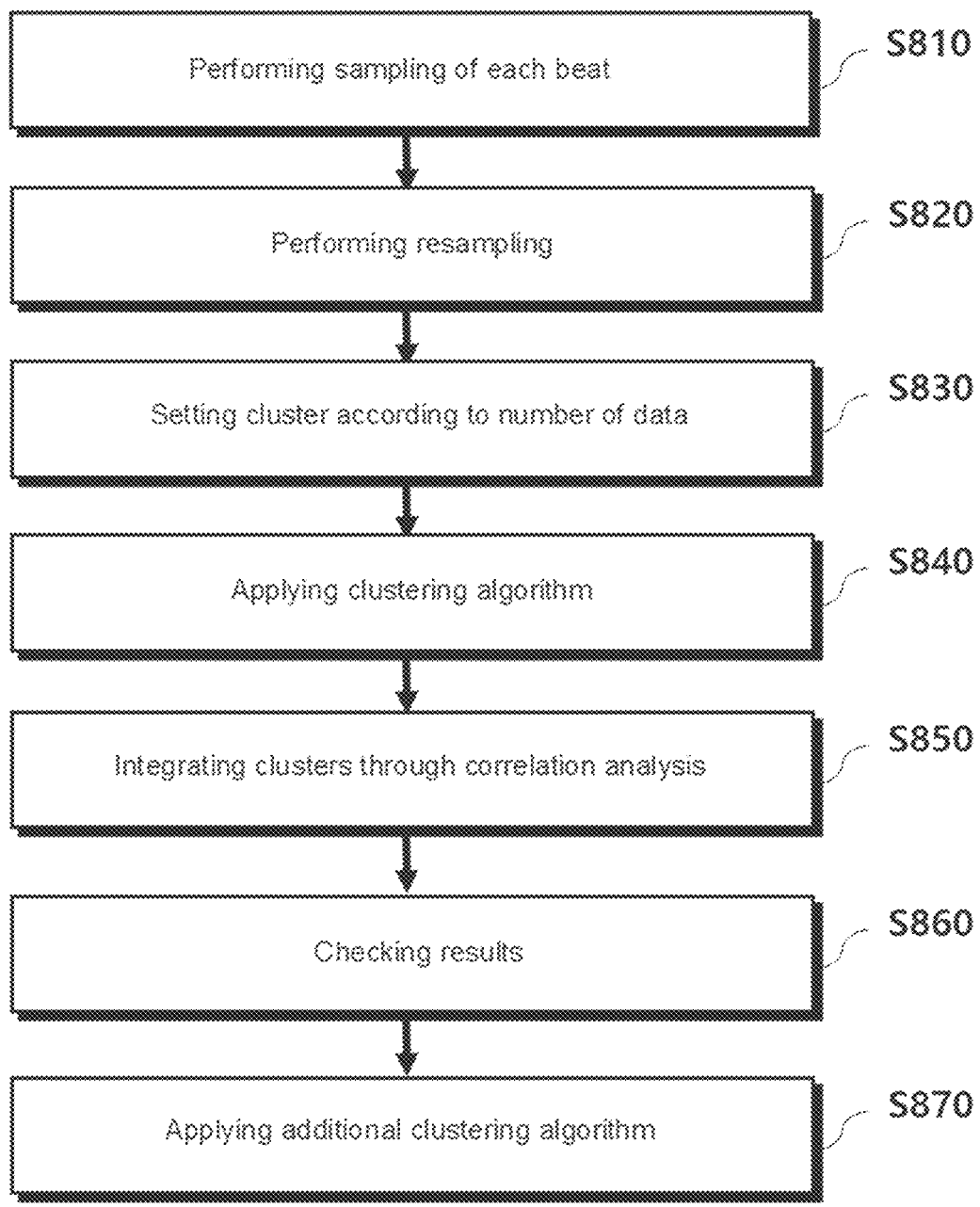
FIG. 8 is a flowchart for explaining an additional clustering method according to the present embodiment.

FIG. 8 is a flowchart for explaining an additional clustering method according to the present embodiment.

The electrocardiogram reading apparatus 300 performs sampling of each beat (S810). The electrocardiogram reading apparatus 300 performs resampling of the sampled beats (S820).

The electrocardiogram reading apparatus 300 sets a cluster according to the number of data (S830). The electrocardiogram reading apparatus 300 applies a clustering algorithm (S840). The electrocardiogram reading apparatus 300 integrates the clusters using correlation analysis (S850). The electrocardiogram reading apparatus 300 checks the results (S860). The electrocardiogram reading apparatus 300 applies an additional clustering algorithm (S870).

Although it is described that the steps S810 to S870 are sequentially executed in FIG. 8, the present disclosure is not necessarily limited thereto. In other words, since changing and executing the steps described in FIG. 8 or executing one or more steps in parallel can be applied, FIG. 8 is not limited to a time-series order.

As described above, the additional clustering method according to the present embodiment described in FIG. 8 may be recorded in a recording medium which is implemented with a program and can be read by a computer. The recording medium in which the program for implementing the additional clustering method according to the present embodiment is recorded, and the method can be read by the computer includes all types of recording devices in which data readable by a computer system is stored.

The above description is merely exemplarily explaining the technical spirit of the present embodiment, and various modifications and variations will be possible without departing from the essential features of the present embodiment by those skilled in the art to which the present embodiment belongs. Accordingly, the present embodiments are intended to explain rather than limit the technical spirit of the present embodiment, and the scope of the technical spirit of the present embodiment is not limited by these embodiments. The protection scope of the present embodiment should be interpreted by the following claims, and all technical spirits within the scope equivalent thereto should be interpreted as being included in the right scope of the present embodiment.

EXPLANATION OF REFERENCE NUMERALS

300: Electrocardiogram reading apparatus
310: Electrocardiogram waveform acquisition unit
320: Waveform reading unit
330: Occurrence time management unit
340: Grouping unit
350: Reading correction unit
360: Rhythm correction unit

The invention claimed is:

1. An electrocardiogram reading apparatus including:
an electrocardiogram waveform acquisition unit for receiving electrocardiogram waveforms (ECG Raw Data);
a waveform reading unit for outputting a reading result of analyzing the electrocardiogram waveforms based on a preset waveform shape and RR interval on one side of a screen;
an occurrence time management unit for matching with the electrocardiogram waveforms to generate a reading time for each reading result as described above in a separate beat table and outputting it on the other side of the screen;
a grouping unit configured to extract electrocardiogram waveforms at preset certain front and rear intervals based on the center of the peak, and perform clustering to group similar shapes, wherein the grouping is automatically adjusted based on waveform shape and RR interval; and
a reading correction unit for allowing to correct together the reading result matched with the specific electrocardiogram waveform on the beat table when the reading result of the specific electrocardiogram waveform is corrected,
wherein the reading correction unit is further configured to identify a plurality of waveforms having similar shapes to the corrected waveform using a correlation analysis algorithm and collectively correct the waveform results among the identified waveforms.

2. The electrocardiogram reading apparatus of claim 1, wherein the waveform reading unit reads the electrocardiogram waveforms as any one of normal beat (N), supraventricular ectopic beat(S), ventricular ectopic beat (V), fusion beat (F), and unknown beat (Q) based on the preset waveform shape and RR interval.

3. The electrocardiogram reading apparatus of claim 1, wherein when a specific reading time is selected from the beat table, the waveform reading unit allows a waveform occurrence time to be output on the electrocardiogram waveform corresponding to the specific reading time.

4. The electrocardiogram reading apparatus of claim 1, wherein when unread beats exist in the electrocardiogram waveforms, the grouping unit clusters waveforms having beats similar to the unread beats and groups them as candidate data.

5. The electrocardiogram reading apparatus of claim 1, wherein the grouping unit divides each waveform into three groups based on the interval between the peak and the peak in the beat existing in the electrocardiogram waveforms and the next beat.

6. The electrocardiogram reading apparatus of claim 1, wherein when the reading result of the specific electrocardiogram waveform is corrected, the reading correction unit performs correlation analysis with the corrected waveforms among the groups to collectively correct the waveform results in the group having similar subsequent waveforms, and logs the correction history with timestamp metadata for traceability.

7. The electrocardiogram reading apparatus of claim 1, wherein when the reading result of the specific electrocardiogram waveform is corrected, the reading correction unit allows the corrected result to be reflected in the beat table, and when a waveform having a shape similar to the corrected result does not exist, it is newly added to the beat table.

8. The electrocardiogram reading apparatus of claim 1, wherein the grouping unit adds a new group and divides it into a separate group when the waveform shape is not distinguished from the beat table.

9. The electrocardiogram reading apparatus of claim 1, additionally including a rhythm correction unit for recording the start time and end time for each time as the reading result for each rhythm on the reading result confirmation screen for each rhythm, and then outputting the corresponding rhythm part when a waveform is selected, and adding, correcting, or removing the corresponding rhythm from the beat table and waveform when a rhythm is corrected or removed.

10. The electrocardiogram reading apparatus of claim 1, wherein the occurrence time management unit divides the electrocardiogram waveforms into beats, rhythms, and groups to output them, and matches and stores the start time and end time by time for each beat, rhythm, and group.

* * * * *